Jan. 5, 1932.  W. H. LUTZ  1,839,976
SWINGING LANDING GEAR
Filed May 24, 1930  4 Sheets-Sheet 1
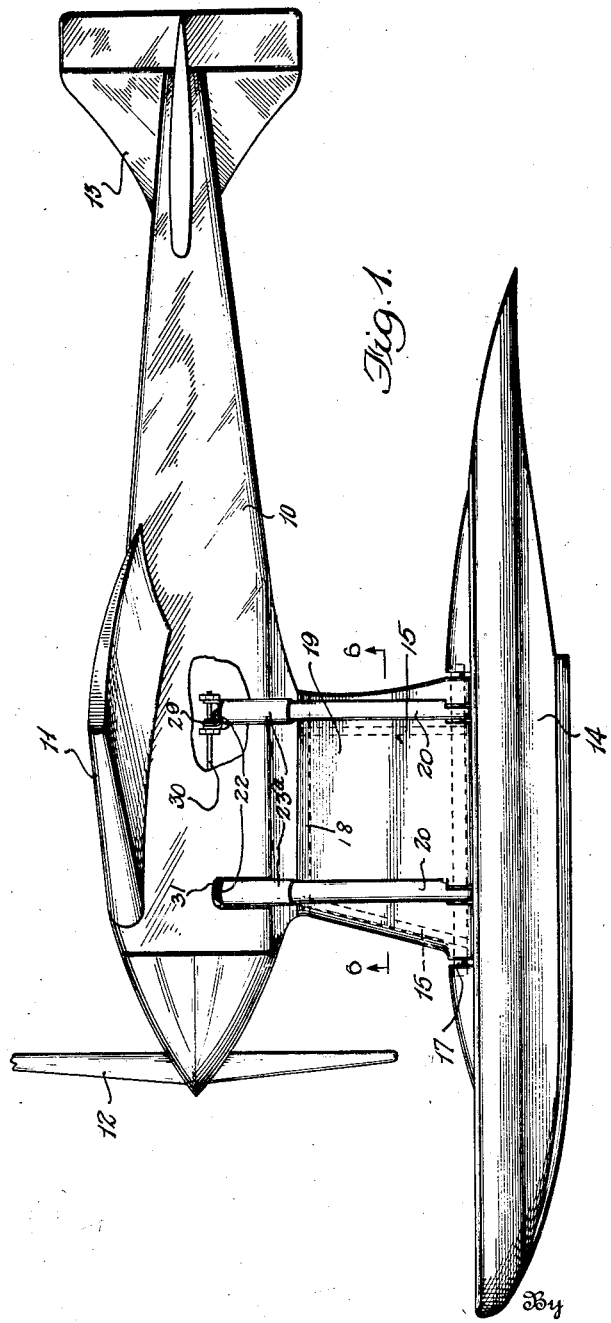
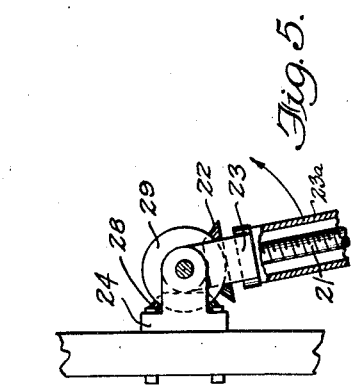
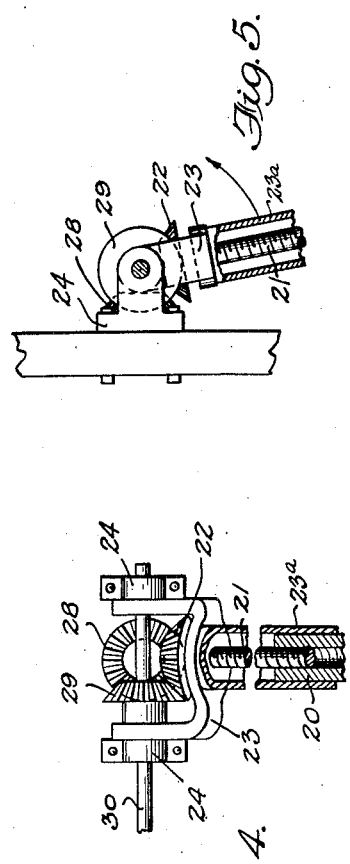
Inventor
Walter H. Lutz
Munson H. Lane.
By
Attorney Jan. 5, 1932. W. H. LUTZ 1,839,976
SWINGING LANDING GEAR
Filed May 24, 1930   4 Sheets-Sheet 2
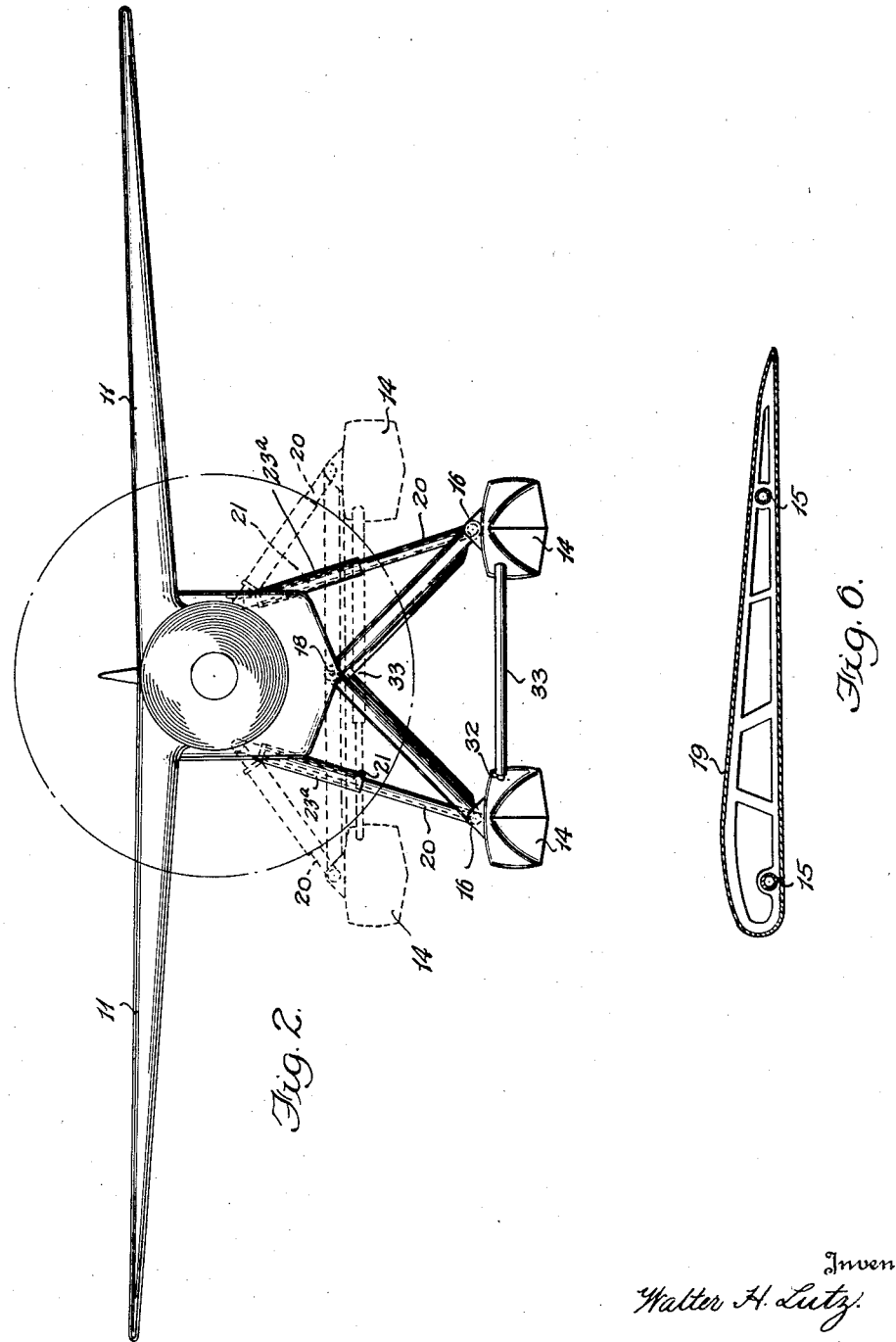

Jan. 5, 1932.  W. H. LUTZ  1,839,976
SWINGING LANDING GEAR
Filed May 24, 1930  4 Sheets-Sheet 3

Inventor
Walter H. Lutz.

By Munson H Lane
Attorney

Jan. 5, 1932. W. H. LUTZ 1,839,976
SWINGING LANDING GEAR
Filed May 24, 1930 4 Sheets-Sheet 4

Inventor
Walter H. Lutz.
By Munson H. Lane
Attorney

Patented Jan. 5, 1932

1,839,976

UNITED STATES PATENT OFFICE

WALTER H. LUTZ, OF WASHINGTON, DISTRICT OF COLUMBIA

SWINGING LANDING GEAR

Application filed May 24, 1930. Serial No. 455,341.

The invention relates to improvements in the landing gear of planes, particularly of the high wing monoplane type. In planes of this type the wings extend laterally from adjacent the top of the fuselage, and the landing gear is carried by struts, extending downwardly, and generally at a diverging angle from the lower portion of the fuselage. The landing gear employed may be either wheels or floats.

It has been found that the landing gear very materially increases the parasitic resistance of the plane, and it is the object of the present invention to reduce this parasitic resistance.

To this above end, I propose to turn the struts of the landing gear to a useful purpose by causing them to swing to a horizontal position after taking off, and by connecting these struts with suitable covering material to make them serve as an additional plane during flight. By this arrangement the landing gear is brought nearer to the center of propulsion, which is of great aero-dynamic advantage, as it reduces the tendency of the landing gear (especially floats) to act as a stationary depth rudder. This arrangement creates two new sources of lifting power, the one direct and the other indirect. The first is the conversion of the landing gear into an additional plane and the second is the reduction of the downward tilt of the plane, normally caused by the air resistance of floats or low landing wheels, when in flight. The means which have been provided for obtaining these additional advantages do not appreciably increase the weight of the plane.

The invention will be more readily understood by reference to the accompanying drawings, in which is set forth an illustrative embodiment of the invention, although it is to be understood that the details are by way of illustration and not by way of limitation.

In the drawings:

Fig. 1 is a side elevation showing a high wing monoplane having landing gear of the float type embodying my invention;

Fig. 2 is a front view of the monoplane shown in Fig. 1;

Figs. 4 and 5 are detail views showing the mechanism for raising and lowering the landing gear;

Fig. 6 is a sectional view on an enlarged scale taken on line 6—6 of Fig. 1 through the struts of the landing gear and showing the covering surrounding said struts for the purpose of converting the same into a plane;

Figure 3:
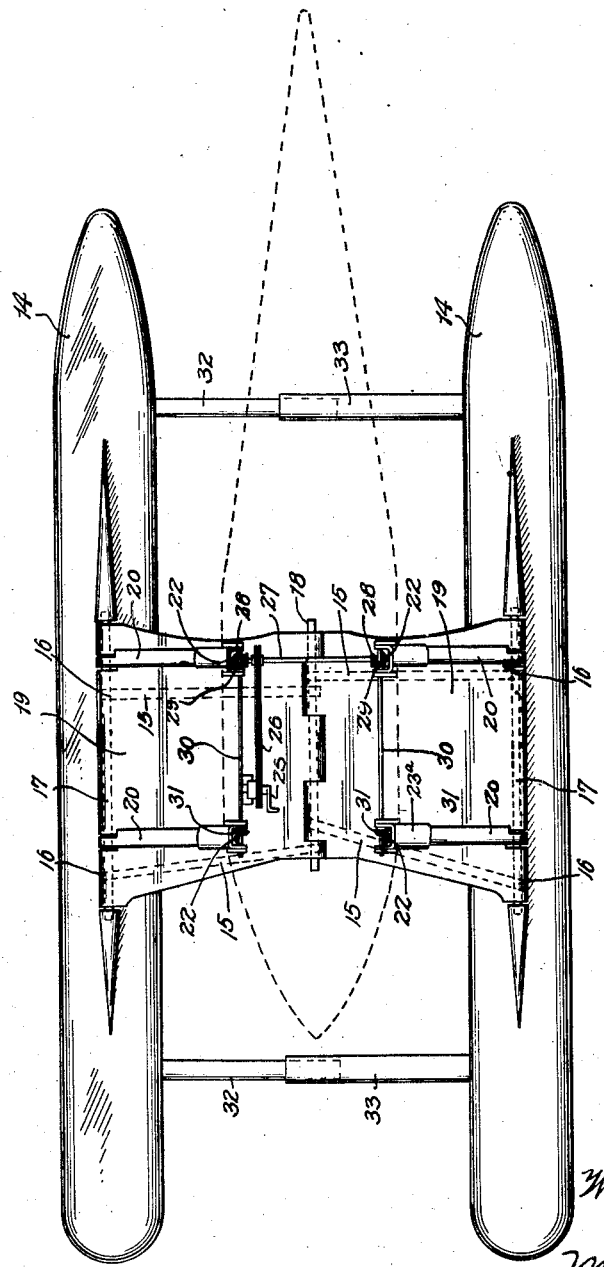
Fig. 3 is a top plan view showing the landing gear, a portion of the fuselage of the plane being shown in dotted lines to indicate the relation of the landing gear to the body.

Referring in detail to the drawings, the reference numeral 10 denotes generally the fuselage of a monoplane herein shown as of the high wing type, having wings 11 extending laterally from the upper portion of the fuselage. The plane may be provided with a suitable propeller 12 of ordinary construction and suitable dirigible means 13 at the rear end thereof.

As is customary with this type of plane, the landing gear comprises a pair of floats or pontoons 14, which in the present instance are supported from the body of the fuselage by means of struts 15, two such struts being provided for supporting each pontoon. In the landing position the struts extend in the form of an inverted V from the longitudinal center line of the fuselage to their respective floats. This position is shown in full lines in Fig. 2. According to the present invention, the struts 15 are hinged at their lower ends 16 to the floats 14, there being provided pivot pins 17 for this purpose. The struts are likewise hinged at their upper ends to a rod 18 extending longitudinally along the lower center line of the fuselage. As clearly illustrated in Fig. 6, the struts are surrounded by suitable covering 19, by means of which a plane surface is created which, as shown, is of stream-line construction. Referring to Fig. 3, it will be noted that the two coverings 19 supporting the two sets of struts meet adjacent the center rod 18.

Suitable means are provided for raising and lowering the landing gear. As shown, pairs of internally threaded rods 20 on each side of the plane are hinged at their lower portions to the floats 14. Cooperating with these hollow members are pairs of externally threaded rods 21, each rod carrying at its upper end a bevel gear 22. Each rod 21 is supported by a yoke 23 (Figs. 4 and 5), which yoke is suitably journalled in brackets 24 secured to one side of the fuselage. Sleeves 23a carried by the yokes 23 cover the externally threaded rods 21.

By rotating the bevelled gears 22 and thereby turning the externally threaded rods 21 within the tubes 20 in one direction, it is obvious that rods 21 and tubes 20 will be caused to telescope, thereby raising the floats 14 from the position shown in full lines in Fig. 2 to that shown in dotted lines in the same figure. By rotating the bevelled gears 22 and rods 21 in the opposite direction, the floats may be caused to be lowered from the dotted line position to the full line position.

Any suitable operating means for simultaneously rotating the rods 21 may be employed. As shown in Fig. 3 a hand crank 25, located preferably within the cabin, operates a sprocket chain 26, thereby rotating a suitable transverse rod 27, which rod carries at opposite ends bevelled gears 28 which coact with bevelled gears 29 on opposite sides of the fuselage. The gears 29 are mounted on rods 30 and on the ends of these rods opposite the gears 29 a pair of bevelled gears 31 are mounted. The four bevelled gears 29 and 31 coact with the four bevelled gears 22 located on the ends of the threaded rods 21 so that the turning of the hand crank 25 results in simultaneous operation of all four of the rods 21, thereby simultaneously raising or lowering at will the two floats 14.

It is desirable to maintain the floats 14 at a minimum fixed distance apart when in lowered position and to maintain them level when in either raised or lowered position. This is accomplished by the use of a pair of telescoping rods 32, 33, one attached to each of the floats 14. When the landing gear is in the lowered position for alighting, the rods 32 and 33 are telescoped as indicated in full lines in Fig. 2, and are at the same time held at the same level. In the raised position indicated in dotted lines, the rods 32 and 33 are expanded but still serve to hold the floats at the same level.

When in the raised or flying position the two pairs of struts 15 and their coverings 19 provide a second wing or plane surface which cooperate with the wings 11 to produce additional lifting effect. When in lowered position the floats 14 serve as effective landing means, the same as ordinary landing devices.

Figure 7:
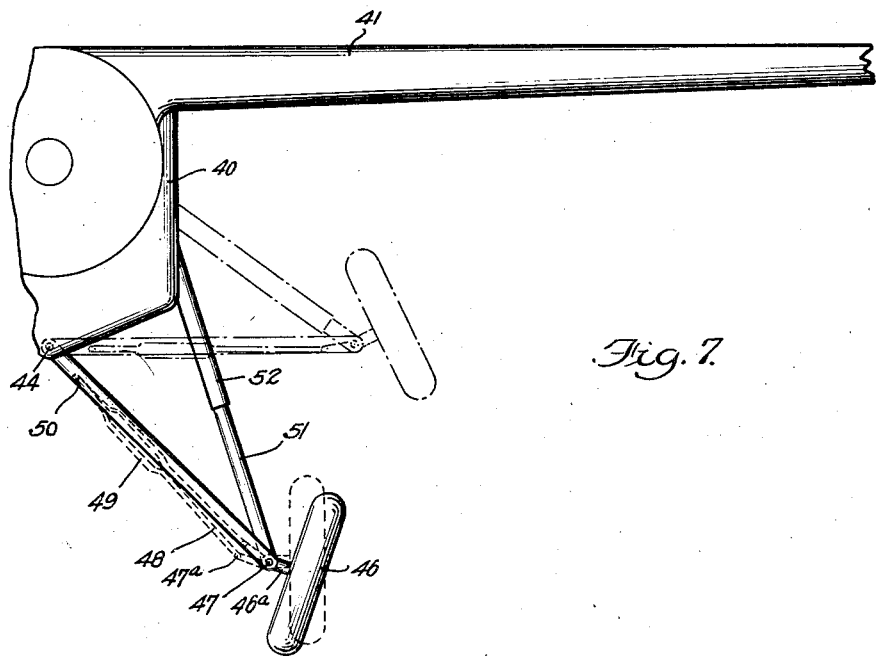
Fig. 7 is a fragmentary view similar to Fig. 2, but showing only one-half of a monoplane which is provided with landing wheels instead of floats.
Figure 8:
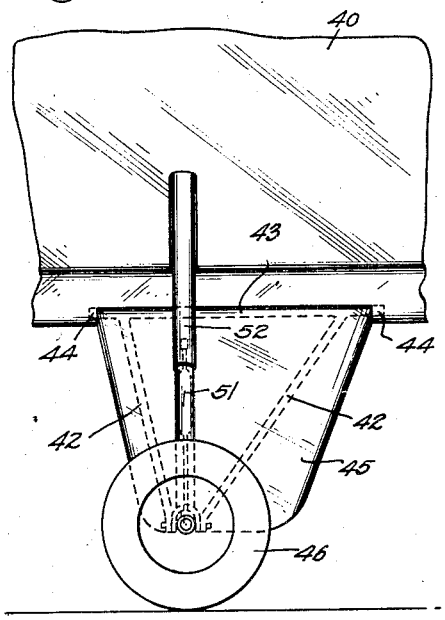
Fig. 8 is a side fragmentary elevation showing the modification disclosed in Fig. 7.

Figs. 7 and 8 are fragmentary views showing a modification of the invention applied to landing wheels instead of floats. The fuselage of the airplane is indicated at 40 and one of the wings at 41. Only one landing wheel is shown, but it will be understood that the same construction is to be applied to each side. Metal struts 42 are connected to a horizontal rod 43 which is pivoted at its ends 44 to the fuselage 40 of the airplane at the lower center line thereof. The framework is covered with wing material 45 similar to the covering 19 shown in Fig. 6. One of the landing wheels is indicated at 46 and is mounted on an axle 46a suitably pivoted at 47 and 47a remote from the wheel 46. The axle is pivotally connected to a rod 48 carried by the usual shock absorber 49, which is pivoted at its opposite end at 50. The covering 45 is cut away in a manner to permit the shock absorber to be substantially enclosed therein, so as to avoid wind resistance. Telescoping members 51, 52 operated in the same manner as the corresponding parts in the previously described embodiment of the invention are employed for raising and lowering the landing gear. When the landing gear is in raised position indicated in dotted lines in Fig. 7, comparatively little wind resistance is offered, the covering 45 serving as an additional lifting surface.

The principal advantage of the invention resides in the fact that the landing gear may be swung to such a position as to be brought nearer the center of propulsion, and when in such position the supports for the floats, wheels or the like serve as additional wing surfaces.

While for the purpose of illustration, specific details of the raising and lowering mechanism have been disclosed as illustrating a preferred embodiment of the invention, nevertheless it is obvious that in its broadest aspects the invention is not limited to the precise details herein disclosed.

What I claim is:

1. In combination with an airplane, a pair of landing devices therefor, two pairs of struts supporting said landing devices, one pair extending in one direction and the other in the other direction from the fuselage of the airplane, and all hinged thereto, streamline coverings for the respective pairs of struts, and means for raising and lowering said covered members, for flight or landing purposes, the said covered members hinged together and meeting at the fuselage and when in raised position providing a continuous, unbroken additional wing surface.

2. Landing gear for airplanes, comprising a pair of landing devices, diverging supports for said landing devices hinged together at the bottom of the fuselage of the airplane, means for swinging said supports from a lowered or landing position to a raised or flight position and vice versa, said supports being of wing formation, and when in raised position serving as an additional plane.

3. In combination with an airplane, a pair of landing devices therefor, two pairs of struts supporting said landing devices, one pair extending in one direction and the other in the other direction from the fuselage of the airplane, and all hinged thereto, streamline coverings for the respective pairs of struts, means for raising and lowering said covered members, for flight or landing purposes, the said covered members when in raised position providing an additional wing surface, and a pair of telescoping rods connecting said landing devices for maintaining the level.

4. Landing gear for airplanes, comprising a pair of landing devices, supports for said landing devices hinged together at the bottom of the fuselage of the airplane, means for swinging said supports from a lowered or landing position to a raised or flight position, and vice versa, said supports being of wing formation, and when in raised position serving as an additional plane.

5. In combination with an airplane having a fuselage rounded at the bottom, a pair of landing devices therefor, supports for said landing devices hinged together at the bottom of the fuselage, means for swinging said supports from a lowered or landing position to a raised or flight position, and vice versa, said supports being of wing formation, and when in raised position forming a continuous, unbroken supporting wing surface or plane.

6. Landing gear for airplanes, comprising a pair of pontoons, supports for said pontoons hinged together at the bottom of the fuselage of the airplane, means for swinging said supports from a lowered or landing position to a raised or flight position, and vice versa, said supports being of wing formation, and when in raised position serving as an additional plane.

In testimony whereof I affix my signature.

WALTER H. LUTZ.